United States Patent
Okubo

[11] Patent Number: 5,391,975
[45] Date of Patent: Feb. 21, 1995

[54] CONSTANT-FREQUENCY ELECTRIC POWER SOURCE

[75] Inventor: Kazuo Okubo, Ise, Japan

[73] Assignee: Shinko Denki Kabushiki Kaisha, Tokyo, Japan

[21] Appl. No.: 51,309

[22] Filed: Apr. 23, 1993

[30] Foreign Application Priority Data

Apr. 28, 1992 [JP] Japan .................. 4-134449

[51] Int. Cl.⁶ .............................................. H02P 9/48
[52] U.S. Cl. .................................. 322/28; 322/29
[58] Field of Search .................. 322/10, 28, 29, 32; 290/38 R

[56] References Cited

U.S. PATENT DOCUMENTS

| | | | |
|---|---|---|---|
| 4,262,242 | 4/1981 | Glennon | 322/28 |
| 4,554,501 | 11/1985 | Baker | 322/29 |
| 4,743,777 | 5/1988 | Shilling et al. | 322/29 X |
| 5,055,765 | 10/1991 | Rozman et al. | 322/28 |
| 5,097,195 | 3/1992 | Raad et al. | 322/10 |
| 5,225,973 | 7/1993 | Patel et al. | 322/28 X |

FOREIGN PATENT DOCUMENTS

| | | |
|---|---|---|
| 50-154716 | 12/1975 | Japan . |
| 57-40382 | 3/1982 | Japan . |
| 4-504647 | 8/1992 | Japan . |

*Primary Examiner*—Kristine L. Peckman
*Attorney, Agent, or Firm*—Oblon, Spivak, McClelland, Maier, & Neustadt

[57] ABSTRACT

A constant-frequency electric power source including an A.C. generator having a field coil, to be driven by an engine and a converter unit which includes a rectifying circuit and an inverter. A controller controls the A.C. generator, and the A.C. generator has at least two groups of multi-phase output coils, one group of the at least two groups of multi-phase output coils being connected to the converter unit for providing an A.C. electric power with a constant-voltage and a constant frequency to be supplied to a first load, and the remaining groups of the at least two pairs of multi-phase output coils being connected to other loads respectively. The output of the remaining groups is supplied to the A.C. generator controller thereby controlling the input of the field coil of the A.C. generator. The A.C. electric power used for the first load is different from the A.C. electric power used for the other loads.

12 Claims, 2 Drawing Sheets

CONSTANT-FREQUENCY ELECTRIC POWER SOURCE

BACKGROUND OF THE INVENTION

1. Field of the Invention

The present invention relates to a constant-frequency electric power source (Variable Speed Constant Frequency) in which an A.C. generator is driven by an engine, for example, of an aircraft, and the output frequency and the output voltage thereof are not changed even when the number of rotations of the engine, i.e. the rotation rate of the engine, is changed, and more particularly to a constant-frequency electric power source capable of supplying an A.C. electric power having desirable characteristics with respect not only to the load of a constant-frequency and constant-voltage but also to the load of variable-frequency and constant-voltage.

2. Description of the Prior Art

There has been known a conventional apparatus as shown in FIG. 1. In FIG. 1, numeral 1 denotes an A.C. generator driven by an engine (not shown) mounted on an aircraft or the like; 2, a field coil of the A.C. generator; 3A, a three-phase output coils composed of three coils $3a_1$ to $3a_3$; and 4, a converter unit composed of a rectifying circuit 5 and an inverter 6, i.e. the converter unit provided with controlling means of PWM (Pulse Width Modulation) or the like for achieving frequency control.

According to the conventional apparatus, the current capacity of the rectifying circuit 5 in the converter unit 4 and the inverter 6 have been set in accordance with the current capacity of the A.C. generator 1. Numeral 7 denotes voltage detecting means such as a potential transformer PT, for detecting the voltages at the input terminals of the converter unit 4, and numeral 8 denotes a generator controlling unit for controlling the current to be supplied to the field coil 2 of the A.C. generator 1 thereby controlling the output voltage of the generator 1 so as to be constant. In the conventional apparatus, the converter unit 4 receives a constant voltage, e.g. 135 volts, from the A.C. generator 1 to rectify it once to a D.C. voltage, e.g. 270 volts, by using the rectifying circuit 5, and then it is converted into an A.C. voltage by using the inverter 6 to supply a three-phase A.C. electric power $P_A$, for example, 400 Hz and 115 volts, to a load.

The variation of voltage to be generated due to the variation of an engine power as a drive source, is compensated by the generator controlling unit 8, and further the variation of frequency is compensated by the PWM (Pulse Width Modulation) control circuit provided in the inverter 6, and accordingly the load supply electric power $P_A$ is controlled to usually maintain a constant voltage and a constant frequency. The electric power source used for some devices mounted on such as aircraft, among the various devices, require constant frequency electric power with high precision as 400 Hz, three-phase, 115 V, however most of some other ones merely require a variable frequency but constant voltage source for a heater of a device such as an de-icing device to be heated by the electric power source.

However, these devices mostly require a normal voltage higher than the output voltage (115 V) of the converter unit, and therefore it has been necessary to use a booster usually having a transformer for boosting the output voltage divided at the output terminals of the converter unit up to the predetermined normal voltage. Since the weight of the booster increases by the weight of the transformer, it has been required to improve the electric power device so as to satisfy the demand to reduce the weight of equipment to be mounted on the aircraft. Furthermore, there was the problem that some distortions in wave-form are undesirably produced in the electric power to be supplied to a second load because of using the divided voltage at the input terminals of the converter unit, thereby decreasing the quality of an electric power.

SUMMARY OF THE INVENTION

The object of the present invention is to present a constant-frequency electric power source in which the above-mentioned problems of the conventional apparatus are solved.

According to the present invention there is proposed the following constant-frequency electric power source.

A constant-frequency electric power source comprising: an A.C. generator including a field coil driven by an engine; a converter unit including a rectifying circuit and an inverter; and means for controlling the A.C. generator; wherein the A.C. generator has at least two groups of multi-phase output coils, one group of aforesaid at least two groups of multi-phase output coils being connected to the converter unit for providing an A.C. electric power with a constant-voltage and a constant-frequency to be supplied to a first load, and the remaining groups of the at least two groups of multi-phase output coils being connected to other loads, respectively, and further the output of the remaining group being supplied to the A.C. generator controlling means thereby controlling the input of the field coil of the A.C. generator, and further the A.C. electric power used for the other load such as the second load being different from the A.C. electric power used for the first loads. In this case, it is desirable that the turn numbers of coils ($3b_1$, $3b_2$, $3b_3$) of each of the remaining groups are suitably set in accordance with the electric power required for each of the other loads.

According to the present invention, there are provided more than two groups of output coils mounted within an A/C generator, and one group thereof is connected to the input terminals of a converter unit in order to use for a first load to be supplied with an electric power having a constant-voltage and constant-frequency, and on the other hand the other group thereof is connected to a second load which may be supplied with an A.C. electric power having a variable-frequency and constant-voltage. Therefore, it is possible to precisely adjust the output voltage from the other group of output coils used for a second load, to a predetermined voltage (e.g. 115 V) under the control of generator controlling means, which resulted from a simple addition of the other group of output coils for the second load. Furthermore, since the electric power to be supplied to the second load is isolated from the converter unit, it is possible to present a preferable waveform without any distortion.

DESCRIPTION OF THE PREFERRED EMBODIMENTS

An embodiment of the present invention will be described hereinafter with reference to the attached drawings.

Figure 1:
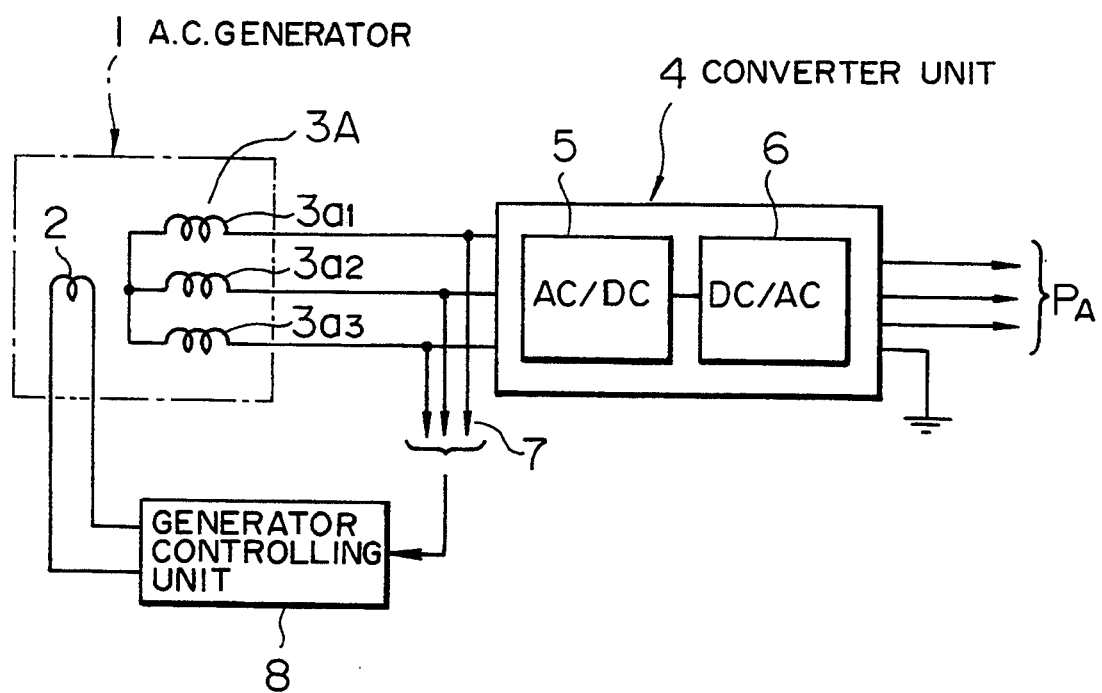
FIG. 1 is a view showing a conventional constant-frequency electric power source.
Figure 2:
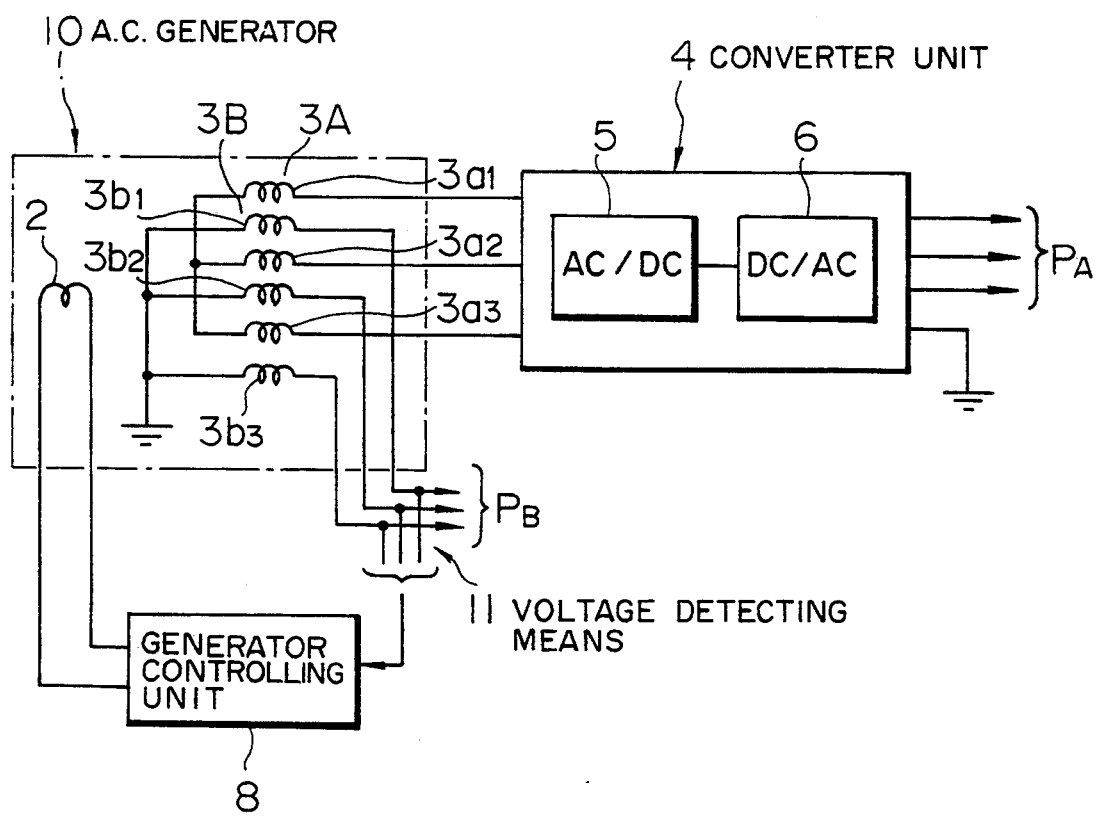
FIG. 2 is a view showing an embodiment of the present invention.

In FIG. 2 showing the embodiment of the present invention, the same or equivalent parts or units as that mentioned in the conventional apparatus shown in FIG. 1, are attached with the same reference numerals.

Numeral 10 denotes an A.C. generator having field coil 2 and two groups of three-phase output coils 3A and 3B. One group of the three-phase output coils 3A composed of three coils $3a_1$, $3a_2$ and $3a_3$ is the same as that of the conventional one mentioned with respect to FIG. 1, and it is connected as output coils for a first load, to input terminals of a converter unit 4 as similar to FIG. 1. On the other hand, the other group of the three-phase output coils 3B composed of three coils $3b_1$, $3b_2$ and $3b_3$ is connected as an A.C. electric power with variable-frequency and constant-voltage, to a second load.

In this case, the turn numbers of the three-phase output coils 3B used for the second load, may be less than that of the three-phase output coils 3A used for the first load by about 30%, and further the turn number of the coils may be suitably set to a predetermined value in accordance with the electric power required for the second load.

Numeral 11 denotes voltage detecting means such as a potential transformer PT, for detecting the voltage at the input terminals of the second load, and the output from the voltage detecting means 11 is applied to a generator controlling unit (generator controlling means) 8 in order to adjust the current supplied to the field coil 2 of the A.C. generator 10 thereby controlling the electric power $P_B$, to keep a predetermined voltage; e.g. 115 V regardless of the variation in number of rotations, i.e. rotation rate, of the engine (not shown).

In the above-mentioned embodiment, there is mentioned the case in which only two kinds of loads, i.e. a first load and a second load exist. There may be, however, provided with many kinds of other loads such as a third load and a fourth load in accordance with actually equipped number of loads. In such a case, of course, it is necessary to further provide additional output coils to be mounted within the A.C. generator required for such third and fourth loads.

As mentioned above, according to the present invention it is possible to provide more than two groups of output coils within an A.C. generator, one group of which is connected to a converter section for supplying an A.C. electric power with a constant-voltage and constant-frequency to a first load, and the other groups of which are connected remaining other loads for supplying an electric power with a variable-frequency and a constant-voltage to the remaining other loads. Therefore, according to the present invention, there is no necessity of providing any transformer which was required for adjusting the voltage supplied to a second load hitherto, and further the weight of an electric power source may be remarkably reduced, because the weight of the group of output coils additionally provided the A.C. generator for supplying electric power to the second load is very light in comparison with that of the above transformer. This results in the remarkable merit that the weight of the electric power source to be mounted on an aircraft or the like may be reduced.

Furthermore, hitherto, in the conventional case where the electric power to be supplied to a second load is divided from the output power from the A.C. generator, the second load undesirably becomes to a non-linear load for the rectifying circuit 5 of the AC/DC converter of the converter unit, thereby generating a large distortion of wave-form of the electric power to be supplied to the second load and reducing the property of an electric power to be supplied. In contrast, according to the present invention, the pair of output coils mounted within the A.C. generator for supplying the electric power for the second load, is completely insulated from the converter unit thereby not generating any distortion of wave-form and further increasing the characteristic of an electric power to be supplied.

What is claimed is:

1. A constant-frequency electric power source comprising:

an A.C. generator including a field coil, to be driven by an engine;

a converter unit including a rectifying circuit and an inverter; and means for controlling said A.C. generator;

wherein said A.C. generator has at least two groups of multi-phase output coils, one group of said at least two groups of multi-phase output coils being connected to said converter unit for providing a first A.C. electric power with a constant-voltage and a constant-frequency to be supplied to a first load, and the remaining groups of said at least two groups of multi-phase output coils being connected to other loads respectively, and further the output coils of said remaining groups being supplied to said A.C. generator controlling means thereby controlling an input of said field coil of said A.C. generator, and said remaining groups of said at least two groups of multi-phase output coils further providing a second A.C. electric power used for said other loads being different from the first A.C. electric power used for said first load.

2. A constant-frequency electric power source according to claim 1, wherein said second A.C. electric power used for said other loads has a variable-frequency and a constant-voltage.

3. A constant-frequency electric power source according to claim 1, wherein the turn number of coils of each of said remaining groups is suitably set in accordance with said second electric power required for each of said other loads.

4. A constant-frequency electric power source according to claim 1, wherein said remaining groups of coils mounted within said A.C. generator for supplying said second A.C. electric power for said other loads, are completely insulated from said converter unit.

5. A constant-frequency electric power source according to claim 1, wherein each of the at least two groups of multi-phase output coils comprises coils of at least three phases.

6. A constant-frequency electric power source according to claim 1, wherein each of the at least two groups of multi-phase output coils have the same number of output coils.

7. A constant-frequency electric power source comprising:

an A.C. generator including a field coil, to be driven by an engine;

a converter unit including a rectifying circuit and an inverter; and means for controlling said A.C. generator;

wherein said A.C. generator comprises at least first and second groups of multi-phase output coils, the first group of multi-phase output coils being connected to said converter unit for providing a first A.C. electric power with a constant-voltage and a constant-frequency to be supplied to a first load, and the second group of multi-phase output coils being connected to at least a second load, the output coils of said second group of multi-phase output coils being supplied to said A.C. generator controlling means thereby controlling an input of said field coil of said A.C. generator, the second group of multi-phase output coils providing a second A.C. electric power used for said at least second load and which is different from the first A.C. electric power used for said first load.

8. A constant-frequency electric power source according to claim 7, wherein said second A.C. electric power used for said at least second load has a variable-frequency and a constant-voltage.

9. A constant-frequency electric power source according to claim 7, wherein the turn number of coils of said second group of multi-phase output coils is set in accordance with the second A.C. electric power required for said at least second load.

10. A constant-frequency electric power source according to claim 7, wherein said second group of multi-phase output coils for supplying said second A.C. electric power for said at least second load, are insulated from said converter unit.

11. A constant-frequency electric power source according to claim 7, wherein each of the at least first and second groups of multi-phase output coils comprises coils of at least three phases.

12. A constant-frequency electric power source according to claim 7, wherein each of the at least first and second groups of multi-phase output coils have the same number of output coils.

* * * * *